UNITED STATES PATENT OFFICE.

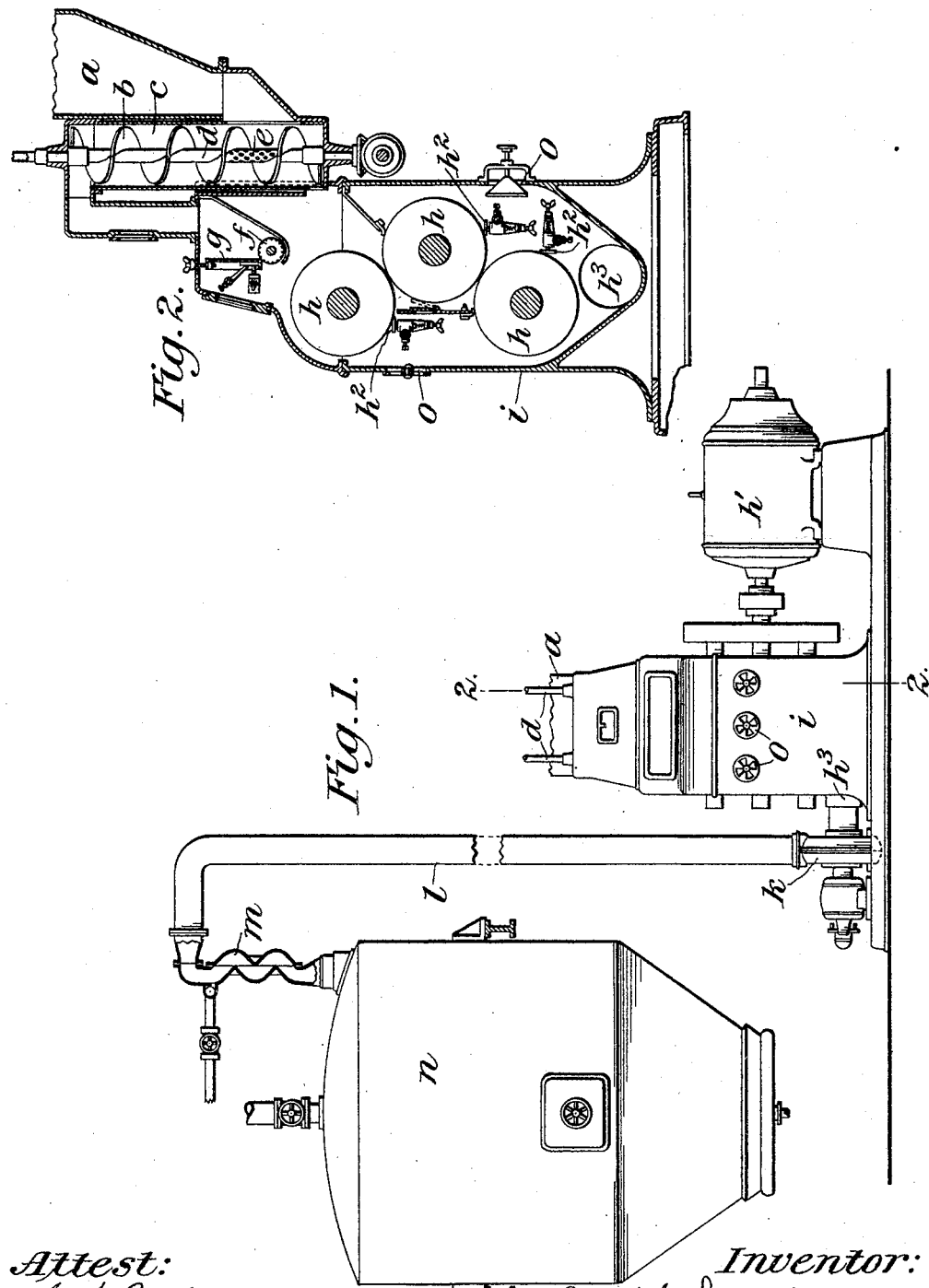

JOSEPH SCHNEIBLE, OF WEEHAWKEN, NEW JERSEY, ASSIGNOR TO THE JOSEPH SCHNEIBLE COMPANY, OF WEEHAWKEN, NEW JERSEY, A CORPORATION OF NEW JERSEY.

ART OF BREWING.

No. 799,407.     Specification of Letters Patent.     Patented Sept. 12, 1905.

Application filed August 1, 1904. Serial No. 219,059.

*To all whom it may concern:*

Be it known that I, JOSEPH SCHNEIBLE, a citizen of the United States, residing in Weehawken, in the county of Hudson, in the State of New Jersey, have invented certain new and useful Improvements in the Art of Brewing, of which the following is a specification, reference being had to the accompanying drawings, forming a part hereof.

In the preparation of malted grain for mashing as usually practiced the grain is delivered to the rolls of the malt-mill in the thoroughly-dry condition in which it has been preserved in the bins in order to prevent it from slaking. In this condition the hulls of the grain, as well as the kernels, are brittle and easily broken. The rolls of the mill are therefore set so as to merely crack the berry, since if they were set close the hulls would be broken up so much as to destroy the filtering qualities which it is highly desirable that the hulls shall possess in order that when the mashing has been completed the wort shall run off quickly from the grains, thereby avoiding impairment of the quality of the wort and promoting the complete separation of extract matter from the grain. The mere cracking of the berries in the mill, which prevents the breaking up of the hulls to such an extent as to impair their filtering quality, is not sufficient, however, to reduce the starchy portions of the grain to such a finely-divided condition as is necessary to permit the diastase in the mash to act upon all of it, whereby the yield of extract matter in the mash falls short of that which is theoretically possible. The yield of extract might therefore be increased, while the quality of the wort is maintained if the starchy portions of the grain were reduced to a more finely-divided condition without an attendant breaking up of the hulls; and it is one object of this invention to attain this result. This is accomplished by moistening the hulls of the grain before it is delivered to the mill without permitting the starchy portions to become moistened. Should the moisture be allowed to penetrate the body of the grain, the hard or flinty portions, which are naturally brittle and break up easily in the mill when they reach the mill in a dry condition, would absorb moisture, losing their flinty and brittle character and becoming pliable and elastic. In this condition they would fail to be reduced to the desired fineness, forming elastic bodies which would resist the reducing action of the rolls and the action of the diastase in the mash. It is therefore necessary that the milling of the grain take place immediately after it is moistened, for if the grain were allowed to lie for any considerable time in a moistened condition not only would the body of the grain absorb the moisture, as already explained, but there would be danger of the beginning of enzymic reaction before the grain reaches the mash. It will be obvious that such reaction might also begin in the milled grain if it were allowed to lie for any great length of time after milling, as is now commonly the case where the milled grain is stored in bins for some time, usually at least a day, before it is conveyed to the mash-tub.

This invention seeks to provide, therefore, for treatment of the grain in a practically continuous operation from the moistening to the mashing, to permit the subjection of substantially the entire starchy portion of the grain to the action of the diastase, to avoid the danger of change in the character of either the unmilled grain or the milled grain through lying for a considerable time in a moistened condition, and to secure the delivery of the hulls to the mash-tub with their filtering quality unimpaired. To attain these results, the grain is moistened and then milled immediately, the grain passing directly from the moistener to the rolls of the mill and being then delivered from the mill to the mash-tub. All of these steps—namely, the moistening, the milling, and the mashing—take place in immediate succession in a practically continuous operation, during which the grain is preferably at no time at rest, but is continuously moving on from the storage-bin to the mash-tub. The grain might be allowed to rest for a short time after the milling; but to attain economical conditions in the practice of the method it is desirable to carry the grain forward continuously from the hopper to the mash-tub. By this method while the hulls of the grain are moistened and become sufficiently pliable to avoid reduction to a finely-divided condition in the passage through the mill the starchy portions of the grain, including the hard flinty parts before referred to, have no opportunity to absorb moisture to such an extent as to render them pliable and elastic, but retain their brittleness and are reduced to fineness in the passage through the mill, the rolls of which are set so closely as to crush these starchy portions. The action of the diastase in the mash-tub is therefore much more complete and thorough than would otherwise be possible. Moreover, the hulls, being moistened and rendered pliable, are not broken up in the mill and are therefore in a much better condition when they reach the mash-tub to form a suitable filter mass from which the work can be quickly drawn off after mashing. It is found that the most satisfactory results are attained by the use of from three to six pounds of water for one hundred pounds of grain for the moistening before the milling.

It will be obvious that the method of treatment of the grain hereinbefore described can be carried out with different forms of apparatus for the performance of the several operations upon the grain, although the several parts should be combined and united in such a way as to permit the carrying out of the method in one continuous operation, as already described. One such form of apparatus suitable for the purposes of the invention is illustrated in the accompanying drawings and for the better explanation of the invention will be particularly described hereinafter.

In the drawings, Figure 1 is a view in outline of a form of apparatus suitable for the practice of the method, and Fig. 2 is a sectional detail view of the mill on a larger scale than that of Fig. 1.

In the apparatus represented in the drawings the malted grain is received in the hopper $a$, by which it is delivered to the moistening device. This may consist of a spiral conveyer $b$, placed vertically within a cylindrical casing $c$, having an opening near the bottom to receive the malted grain from the hopper. The shaft $d$ of this conveyer may be hollow and perforated, as at $e$, near the lower end for the admission of steam or water, as may be desired. The grain is thus not only fed upwardly by the conveyer, but is thoroughly stirred in its progress, so that the grain is uniformly moistened. From the top of the casing $c$ the moistened grain is discharged upon the measuring device, which may consist of a longitudinally-grooved cylinder $f$, rotating between the wall of the casing of the mill and an adjustable scraper $g$, suitable provision being made, if desired, for controlling the speed of rotation of the roll in order to regulate the feed of the moistened grain to the mill. The latter is preferably of the roller type, operating with a crushing action rather than with a grinding action, since the filtering quality of the hulls will be retained in a greater degree by such a mill than by a grinding-mill, in which the hulls might themselves be reduced in part to a more or less finely-divided condition. The mill shown comprises three coöperating rolls $h$, driven by any suitable means, such as a motor $h'$, and provided with scrapers $h^2$ and adjusting devices, as usual in mills of this type. From the rolls the crushed grain falls into the lower part of the mill-casing $i$. It may be allowed to rest at this stage for a short time, if convenience renders such a rest desirable; but it is preferably carried on at once from the discharge-opening $h^3$ to the mash-tub through a foremasher by a strong current of air, which may be created by a fan located at some convenient point, such as the rotary exhaust-fan $k$, the inlet of which is connected with the casing $i$, while the outlet is connected through a pipe $l$ with the foremasher (represented at $m$) and the mash-tub (represented at $n$.) Suitable openings, as at $o$, are provided in the casing $i$ of the mill for the admission of air in sufficient quantity to form a current through the fan and the pipe which will carry with it all of the milled grain, including both the finely-divided starchy particles and the hulls, and will deliver them through the foremasher, where the grains are thoroughly wet, and to the mash-tub, in which mashing proceeds also in the usual manner.

It will be observed that with an apparatus of such a character as that shown in the drawings, whether the details of construction be as there represented or of some other suitable character, the malted grain received in the hopper $a$ is moistened uniformly and at the same time fed forward, so that it passes immediately to the mill. The hulls of the grain, which it is particularly the purpose of the moistener to soften and render pliable, are thus brought to the desired condition, while the starchy portion or meal-body of the grain, including the hard flinty portions, is not moistened to such an extent as to prevent it from being completely broken up and reduced thereafter to such a finely-divided condition as to permit the diastase to act practically upon every particle of the starchy matter. Without pause in its forward movement the grain is measured and delivered continuously to the mill, in which the starchy portion or meal-body is broken up, as already described, while the hulls are merely flattened and discharged, together with the starchy portions, in the best possible condition to form the filter mass after the mashing has been completed. Preferably, also, without pause in its continuous forward movement the milled grain is carried forward with a current of air and while in this continuous movement is subjected to the action of the foremasher, so that every particle is thoroughly wet as it is delivered to the mash-tub for further treatment.

I claim as my invention—

1. The improvement in the art of brewing which consists in moistening the hulls only of malted grain, reducing the starchy portion while dry to a finely-divided condition, and mashing the finely-divided starchy portion and the hulls together, substantially as described.

2. The improvement in the art of brewing which consists in moistening the hulls only of malted grain, reducing the starchy portion while dry to a finely-divided condition, delivering the finely-divided starchy portion and the hulls together to the mash-tub, moistening the same on the way to the mash-tub, and completing the mashing, substantially as described.

3. The improvement in the art of brewing which consists in moistening the hulls only of malted grain, reducing the starchy portion while dry to a finely-divided condition, carrying forward the finely-divided portion and the hulls together by an air-current, and mashing the same, substantially as described.

4. The improvement in the art of brewing which consists in moistening the hulls only of malted grain, reducing the starchy portion while dry to a finely-divided condition, carrying forward the finely-divided starchy portion and the hulls together by an air-current, moistening the finely-divided starchy portion and the hulls as they are carried forward by the air-current, and completing the mashing, substantially as described.

This specification signed and witnessed this 25th day of July, A. D. 1904.

JOSEPH SCHNEIBLE.

In presence of—
JOHN DAY, Jr.,
W. B. GREELEY.